(12) United States Patent
Taniguchi

(10) Patent No.: US 8,064,190 B2
(45) Date of Patent: Nov. 22, 2011

(54) MULTI-LAYER CERAMIC CAPACITOR AND MANUFACTURING METHOD OF MULTI-LAYER CERAMIC CAPACITOR

(75) Inventor: Katsuya Taniguchi, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 582 days.

(21) Appl. No.: 12/188,992

(22) Filed: Aug. 8, 2008

(65) Prior Publication Data
US 2009/0073635 A1    Mar. 19, 2009

(30) Foreign Application Priority Data
Aug. 9, 2007 (JP) ................................ 2007-208659

(51) Int. Cl.
*H01G 4/06* (2006.01)
*C04B 35/00* (2006.01)

(52) U.S. Cl. .................... 361/321.4; 361/321.5; 501/137

(58) Field of Classification Search .... 361/321.1–321.5; 501/135–139
See application file for complete search history.

(56) References Cited

U.S. PATENT DOCUMENTS

| | | | | |
|---|---|---|---|---|
| 7,528,088 B2 * | 5/2009 | Umeda et al. | ................. | 501/139 |
| 2002/0137622 A1 * | 9/2002 | Tokita et al. | ................. | 501/137 |
| 2006/0251927 A1 * | 11/2006 | Umeda et al. | ................. | 428/701 |

FOREIGN PATENT DOCUMENTS
JP    2006-287045    10/2006
* cited by examiner

*Primary Examiner* — Eric Thomas
(74) *Attorney, Agent, or Firm* — Law Office of Katsuhiro Arai

(57) ABSTRACT

A small, large-capacitance multi-layer ceramic capacitor suppressed for remarkable lowering of permittivity, having a capacitor main body formed of ceramic dielectric layers comprising barium titanate as a main component and an Si oxide at a ratio of 0.5 to 10 mol being converted as $SiO_2$ based on 100 mol of barium titanate and internal electrode layers, and a pair of external electrodes which are formed at the end faces of the capacitor main body and connected electrically with the internal electrode layers, in which the ceramic dielectric layer has crystal grains, crystal grain boundaries each present between the crystal grains and a grain boundary triple point, and B/A is 0.5 or less assuming the amount (mol) of an Si oxide being converted as $SiO_2$ contained based on 100 mol of barium titanate as A and the volumic rate (vol %) of the Si oxide present at the crystal grain boundary and the grain boundary triple point of the ceramic dielectric layer as B, whereby remarkable lowering of a permittivity due to precipitation of an Si oxide to the crystal grain boundary and the grain boundary triple point is suppressed.

10 Claims, 2 Drawing Sheets

[Fig. 1]
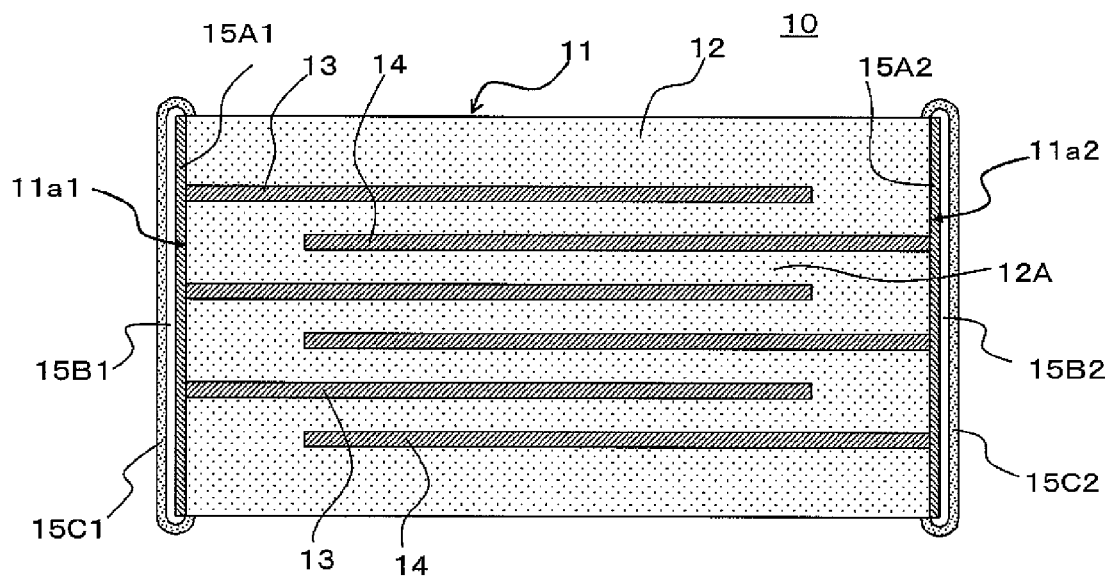
[Fig. 2]
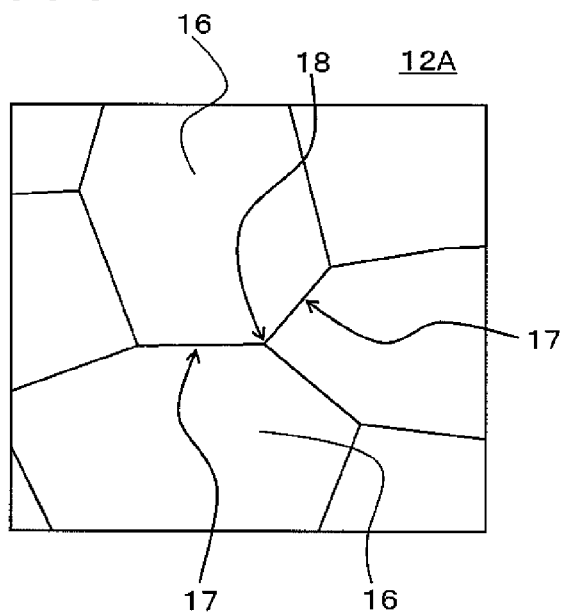

[Fig. 3]
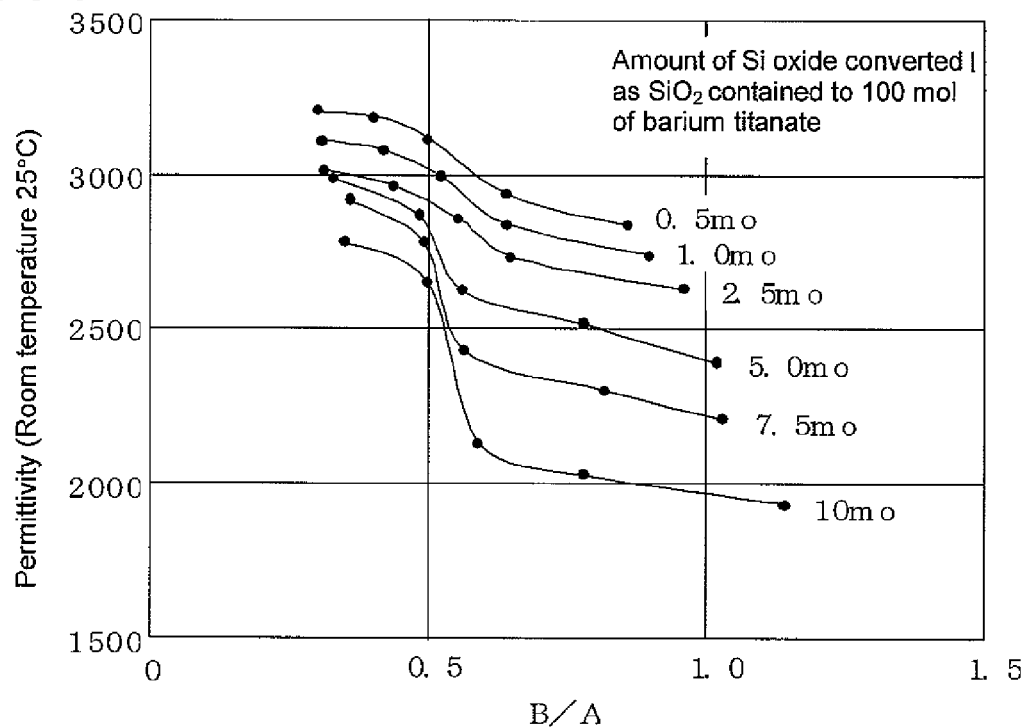
[Fig. 4]
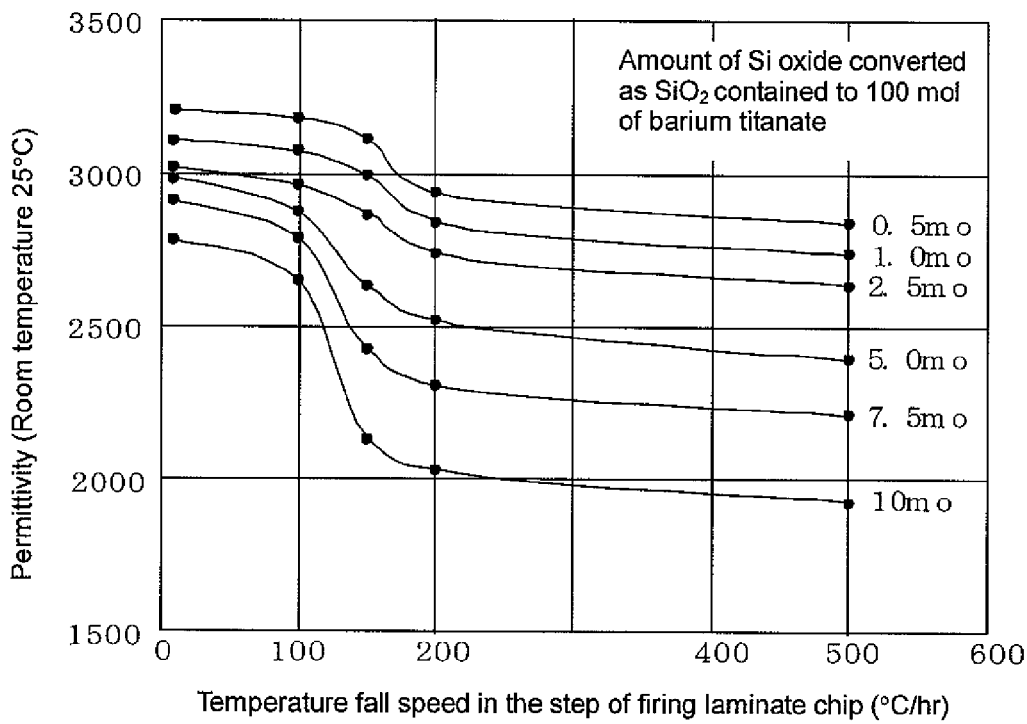

MULTI-LAYER CERAMIC CAPACITOR AND MANUFACTURING METHOD OF MULTI-LAYER CERAMIC CAPACITOR

PRIORITY

This application claims priority to Japanese Patent Application No. 208659/2007, filed Aug. 9, 2007, which is hereby incorporated by reference in its entirety.

BACKGROUND OF THE INVENTION

1. Field of the Invention

The present invention concerns a small, large-capacitance multi-layer ceramic capacitor.

2. Description of the Related Art

Japanese Unexamined Publication No. 2006-287045 proposes to provide an electronic part having ceramic dielectric layers comprising barium titanate as a main component such as a multi-layer ceramic capacitor excellent in electric characteristic, excellent in temperature characteristic even in a case of reducing the thickness of the ceramic dielectric layer, having high reliability, reduced in the size and of large capacitance, by controlling the ratio of ceramic particles having a thickness of the crystal grain boundary present between adjacent ceramic crystal grains of 1 nm or less, among a plurality of ceramic particles constituting the ceramic dielectric layers.

The multi-layer ceramic capacitor described in the existent technique contains a glass component containing a Ba oxide, a Ca oxide, and an Si oxide, and other auxiliary components in the ceramic dielectric layer.

As other auxiliary component, one or more members selected from an Mg oxide, one or both of an Mn oxide and a Cr oxide and one or more of a V oxide, a W oxide, a Ta oxide, and an Nb oxide and an oxide of R (in which R is one or more members selected from Sc, Er, Tm, Yb, Lu, Y, Dy, Ho, Tb, Gd, and Eu, preferably, one or more members selected from Y, Dy, and Ho) are used.

The Mg oxide has an effect of flattening the temperature characteristic of electrostatic capacity and an effect of suppressing the grain growth. Further, the Mn oxide and the Cr oxide have an effect of promoting sintering, an effect of enhancing Ir (insulation resistance), and an effect of improving the high accelerated life time. The V oxide, the W oxide, the Ta oxide, and the Nb oxide have an effect of improving the high accelerated life time. The R oxide shows mainly an effect of improving the high accelerated life time.

Further, in the glass component, the Ba oxide and the Ca oxide show an effect of improving the temperature characteristic of the electrostatic capacity (rate of change of the electrostatic capacity to temperature), and the Si oxide functions as a sintering aid.

Then, the mixing amount (ratio) of the glass component raw material based on 100 mol of barium titanate is from 0.5 to 12 mol (excluding 0.5) for Ba oxide+Ca oxide and from 0.5 to 12 mol (excluding 0.5) for Si oxide when converting the Ba oxide to BaO, the Ca oxide to CaO, and the Si oxide to $SiO_2$.

By incorporating the glass component in a predetermined range, the ratio of particles with the thickness of the crystal grain boundary of 1 nm or less or 0.75 nm or less can be controlled.

In the method of manufacturing the multi-layer ceramic capacitor, the content for each of the oxides in the dielectric substance raw material is determined so as to provide the dielectric substance porcelain described above after firing, a binder and a solvent are added and mixed to the obtained dielectric substance raw material to prepare a slurry for use in the ceramic dielectric layer and a green sheet is formed by a doctor blade method. A paste for an Ni internal electrode is printed to the surface of the obtained green sheet to prepare a ceramic sheet for a electrostatic capacity forming region having an internal electrode pattern, the ceramic sheets are laminated in plurality such that ends of the internal electrode patterns are exposed alternately to a pair of end faces of a laminate chip opposed to each other upon cutting the ceramic sheet into individual laminate chips, protecting green sheets not printed with the internal electrode pattern are laminated and crimped above and below them, and the obtained laminate is cut to a predetermined size to obtain a laminate chip, subjected to a debinding processing, fired at a programming rate of 200° C./hr, at a maintenance temperature of about 1200° C. (1180° C. to 1280° C.) for a temperature holding time of 2 hr and at a cooling rate of 200° C./hr and further annealed to obtain a sintered body.

Then, the end faces of the obtained sintered body are polished and external electrodes are coated and fired to obtain a multi-layer ceramic capacitor.

The multi-layer ceramic capacitor described in the existent technique contains an Si oxide that functions as a sintering aid being converted as $SiO_2$ from 0.5 to 12 mol based on 100 mol of barium titanate in the ceramic dielectric layer. Accordingly, this involves a problem that the glass phase is precipitated to the crystal grain boundary in the ceramic dielectric layer by the addition of the Si oxide to exert compressive stresses on a plurality of ceramic crystal grains constituting the ceramic dielectric layer thereby lowering the permittivity further with respect to the volumic ratio of the crystal grain boundary.

SUMMARY OF THE INVENTION

It has been found that the permittivity of the ceramic dielectric layer can be lowered remarkably in a case where the amount (A) of the Si oxide being converted as $SiO_2$ contained therein based on 100 mol of barium titanate and the volumic ratio (vol %) (B) of the Si oxide present at the crystal grain boundary and the grain boundary triple point in the ceramic dielectric layer are in a predetermined relation, to attain the invention.

Further, it has been found that the permittivity of the ceramic dielectric layer can be lowered remarkably when the rate of temperature reduction in the step of firing the laminate chip exceeds a predetermined rate.

One embodiment provides a multi-layer ceramic capacitor capable of suppressing excessive lowering of the permittivity.

The embodiment further provides a method of manufacturing a multi-layer ceramic capacitor capable of stable production with no excessive lowering of the permittivity.

The present embodiment provides a multi-layer ceramic capacitor having a substantially hexahedral capacitor main body in which ceramic dielectric layers comprising barium titanate as a main component and internal electrode layers are laminated alternately and the internal electrode layers are formed such that ends thereof are exposed alternately to end faces opposite to each other, and a pair of external electrodes which are formed at the end faces where the ends of the internal electrode layers of the capacitor main body are exposed and connected electrically with the internal electrode layers, in which the ceramic dielectric layer contains an Si oxide being converted as $SiO_2$ at a ratio of from 0.5 to 10 mol based on 100 mol of barium titanate, wherein the ceramic dielectric layer has crystal grains, a crystal grains boundary present between the crystal grains and a grain boundary triple point, and B/A is 0.5 or less assuming the amount (mol) of the Si oxide being converted as $SiO_2$ contained based on 100 mol of barium titanate as A, and the volumic ratio (vol %) of the Si oxide present at the crystal grain boundary and the grain boundary triple point of the ceramic dielectric layer as B.

Accordingly, the stress exerted on the crystal grains by the Si oxide present at the crystal grain boundary and the grain boundary triple point in the ceramic dielectric layer can be suppressed. Excessive lowering of the permittivity can also be suppressed.

Further, an embodiment provides a method of manufacturing a multi-layer ceramic capacitor including the steps of;

weighing a barium titanate powder, an Si oxide corresponding to 0.5 to 10 mol being converted as $SiO_2$ based on 100 mol of barium titanate and an extraneous component and then mixing them, adding and mixing a binder and a solvent to the obtained mixture to prepare a slurry, sheeting the obtained slurry, printing an internal electrode material on the surface of the obtained sheet to form an internal electrode pattern, laminating the obtained sheets and then dividing them into a plurality of laminate chips, applying a debinding processing to the obtained laminate chips, firing the obtained laminate chip by elevating the temperature in a reducing atmosphere, maintaining the chips at a predetermined temperature and then reducing the temperature, applying a re-oxidation heat processing to the obtained sintered body chip in a nitrogen gas atmosphere, forming external electrodes to a pair of end faces of the obtained sintered body chip opposed to each other, in which the rate of temperature reduction in the step of firing the laminate chip is 100° C./hr or lower.

Accordingly, the volumic ratio (vol %) of the Si oxide precipitated to the crystal grain boundary and the grain boundary triple point of the ceramic dielectric layer can be suppressed. This can provide a method of manufacturing a multi-layer ceramic capacitor capable of stable production with no remarkable lowering of the permittivity,

BRIEF DESCRIPTION OF THE DRAWINGS

FIG. 1 is a schematic cross sectional view showing the outline of an internal structure of a first embodiment of a multi-layer ceramic capacitor according to the invention;

FIG. 2 is a view prepared by tracing TEM-bright view field images showing the internal structure of a ceramic dielectric layer of a multi-layer ceramic capacitor of the first embodiment;

FIG. 3 is a graph showing the change of permittivity to B/A on each amount (mol) of an Si oxide being converted as $SiO_2$ contained based on 100 mol of barium titanate in the ceramic dielectric layer of the multi-layer ceramic capacitor of the first embodiment; and FIG. 4 is a graph showing the change of permittivity to a rate of temperature reduction in a firing process on each amount (mol) of an Si oxide being converted as $SiO_2$ contained based on 100 mol of barium titanate of the ceramic dielectric layer of a multi-layer ceramic capacitor in the first embodiment of the method of manufacturing the multi-layer ceramic capacitor according to the invention.

DETAILED DESCRIPTION OF PREFERRED EMBODIMENTS

One embodiment of a multi-layer ceramic capacitor according to the invention can be described with reference to FIG. 1 to FIG. 3. FIG. 1 is a schematic cross sectional view for explaining the outline of an internal structure of a multi-layer ceramic capacitor 10 as a first embodiment. FIG. 2 is a schematic cross sectional view of a ceramic dielectric layer 12A of a multi-layer ceramic capacitor 10 of this embodiment. The ceramic dielectric layer 12A has a plurality of crystal grains 16 and has a crystal grain boundary 17 between the crystal grains 16. Further, a site where a plurality of crystal grain boundaries 17 intersect is referred to as a grain boundary triple point 18. FIG. 3 is a graph showing the change of permittivity to B/A assuming the amount (mol) of an Si oxide being converted as $SiO_2$ contained based on 100 mol of barium titanate of the ceramic dielectric layer 12A in the multi-layer ceramic capacitor 10 of this embodiment as A, and assuming the volumic ratio (vol %) of the Si oxide present at the crystal grain boundary 17 and the grain boundary triple point 18 in the ceramic dielectric layer 12A as B.

The multi-layer ceramic capacitor 10 of this embodiment has a substantially hexahedral capacitor main body 11 in which ceramic dielectric layers 12A comprising barium titanate as a main component and internal electrode layers 13, 14 are laminated alternately, and the internal electrode layers 13, 14 are formed such that the ends thereof are exposed to end faces opposite to each other and a pair of external electrodes 15A1, 15A2 which are formed at the end faces 11a1, 11a2 where the ends of the internal electrode layers 13, 14 of the capacitor main body 11 are exposed and connected electrically with the internal electrode layers 13, 14.

Then, the ceramic dielectric layer 12A contains the Si oxide being converted as $SiO_2$ at a ratio from 0.5 to 10 mol based on 100 mol of barium titanate.

Further, the ceramic dielectric layer 12A has crystal grains 16, crystal grain boundaries 17 present between the crystal grains 16, and grain boundary triple points 18.

Assuming the amount (mol) of the Si oxide being converted as $SiO_2$ contained based on 100 mol of barium titanate as A, and the volumic ratio (vol %) of the Si oxide being converted as $SiO_2$ present at the grain boundaries and grain boundary triple points of the ceramic dielectric layer as B, B/A is 0.5 or less.

In another embodiment, a method of manufacturing the multi-layer ceramic capacitor according to the invention can be described with reference to FIG. 4. FIG. 4 is a graph showing the change of permittivity ε to the rate of temperature reduction in the step of firing a laminate chip in the method of manufacturing the multi-layer ceramic capacitor of this embodiment.

The method of manufacturing a multi-layer ceramic capacitor 10 of this embodiment can include the steps of;

weighing a barium titanate powder, an Si oxide being converted as $SiO_2$ corresponding to 0.5 to 10 mol based on 100 mol of barium titanate, and an extraneous component and then mixing them, adding and mixing a binder and a solvent to the obtained mixture to prepare a slurry, sheeting the obtained slurry, printing an internal electrode material to the surface of the obtained sheet to form an internal electrode pattern, laminating the obtained sheets and then dividing them into a plurality of laminate chips, applying a debinding processing to the obtained laminate chip, firing the obtained laminate chip by elevating the temperature of the obtained laminate chip in a reducing atmosphere, holding the chip at a predetermined temperature and reducing the temperature, applying a re-oxidation heat processing to the obtained sintered body chip in a nitrogen gas atmosphere, and forming external electrodes to a pair of end faces of the obtained sintered body chip or laminate chip opposed to each other.

In this embodiment, the rate of temperature reduction in the step of firing the laminate chip can be 100° C./hr or lower.

In another embodiment, the barium titanate is represented by a compositional formula: $(BaO)_m TiO_2$. The molar ratio (A/B ratio) m for the Ba as the A site constituent component and the Ti as the B site constituent component in the formula is not particularly restricted and is from 0.990 to 1.035.

In another embodiment, the Si oxide is an Si-containing oxide and the amount has a value being converted as $SiO_2$. For the Si oxide, it is preferred that the content of the Si oxide being converted as $SiO_2$ is from 0.5 to 10 mol based on 100 mol of barium titanate.

In further embodiments, the extraneous component preferably contains an Mg oxide, an Mn oxide, and an R oxide.

The content of Mg oxide being converted as MgO can be from 0.1 to 2.0 mol based on 100 mol of barium titanate.

Further, the content of the Mn oxide being converted as $Mn_2O_3$ can be from 0.05 to 1.0 mol based on 100 mol of barium titanate.

Further, the content of the R oxide being converted as RO can be from 0.1 to 4.0 mol based on 100 mol of barium titanate.

R can be one or more members selected from Sc, Er, Tm, Yb, Lu, Y, Dy, Ho, Tb, Gd, and Eu and, preferably, one or more member selected from Y, Dy, and Ho.

In a further embodiment, the ceramic dielectric layer 12A can comprise barium titanate, an Si oxide and an additional component.

The internal electrode layers 13, 14 are disposed so as to oppose to each other while putting the ceramic dielectric layer 12 therebetween. The material for the internal electrode layers 13, 14 comprises one of Ni, Ni alloy, Cu, and Cu alloy as a main component.

In other embodiments, the capacitor main body 11 has no particular restriction with respect to the outer shape and the size, and can be properly made depending on the application use and, usually, the outer shape is substantially hexahedral.

In another embodiment, the external electrodes 15A1, 15A2 are formed at a pair of end faces 11a1, 12a2 of the capacitor main body 11 opposed to each other, and vicinity thereof and they are connected to the exposed ends of the internal electrode layers 13, 14 disposed alternately to constitute a capacitor circuit. The material for the external electrodes 15A1, 15A2 can be selected properly, for example, from materials used for the internal electrode layers 13, 14, as well as those used for the firing molds comprising Ag alloys and Ag—Pd alloys as the main component, conductive resins incorporating conductive metal particles in a resin. Further, layers 15B1, 15B2 for improving the resistance to solder-penetration loss and layers 15C1, 15C2 for improving the solder wetting property are preferably formed to the surface of the external electrodes 15A1, 15A2, for example, by a plating method.

In one embodiment, the crystal grain 16 can have an average grain size, for example, of 0.3 µm or less.

In another embodiment, the crystal grain boundary 17 is present between crystal grains 16 and, in this embodiment, the Si oxide present at the crystal grain boundary 17 can be suppressed. The thickness of the crystal grain boundary 17 is, for example, 1 nm.

In further embodiments, the grain boundary triple point 18 means a site where a plurality of crystal grain boundaries 17 intersect. In this embodiment, it is preferred to suppress the Si oxide present at the grain boundary triple point 18. The area of the grain boundary triple point 18 is, for example, 10 $nm^2$.

In another embodiment, the volumic ratio of the Si oxide present at the crystal grain boundary 17 and the grain boundary triple point 18 of the ceramic dielectric layer 12A is small. The volumic ratio is, for example, 2 vol %.

In a further embodiment, the rate of temperature reduction in the step of firing the laminate chip is, preferably, 100° C./hr or lower.

Examples

The present invention is to be described based on more specific examples.

At first, based on 100 mol of barium titanate with a average grain size of 0.2 µm, starting materials are weighed so as to provide a composition of 1 mol of $Ho_2O_3$, 0.5 mol of MgO, 0.1 mol of $Mn_2O_3$, 0.5, 1.0, 2.5, 5.0, 7.5, and 10.0 mol each of $SiO_2$, all per 100 mol of barium titanate. These components are wet mixed in a ball mill and then dried to obtain a mixture.

A slurry is prepared by adding an organic binder and a solvent to the obtained mixture and the obtained slurry is sheeted by a doctor blade method to obtain a sheet of about 1.0 µm thickness. An Ni electrode material paste is coated on the surface of the obtained sheet by screen printing to a thickness of about 1.0 µm to form an internal electrode pattern. Sheets are laminated by 100 layers, and protection sheets are laminated above and below them and crimped under heating to obtain a laminate.

The obtained laminate is cut such that the length is 1.6 mm and the width is 0.8 mm (1608 shape) after firing to obtain a laminate chip. An Ni external electrode paste is coated to a pair of end faces of the obtained laminate chip opposed to each other, applied with a debinding processing by heating at 400° C. for 4 hours in an $N_2$ atmosphere, and then fired in an $N_2$–1 vol % $H_2$ gas mixture atmosphere, under the condition at a programming rate of 500° C./hr, at a maintenance temperature of from 1100 to 1200° C., for 2 hours, at a rate of temperature reduction of 10° C./hr, 100° C./hr, 150° C./hr, 200° C./hr, and 500° C./hr. Since the temperature at the completion of densification of the ceramic dielectric layer 12A is different depending on the Si addition amount, the temperature at which the densification is completed within a range of the maintenance temperature (1100 to 1200° C.) is defined as the firing temperature upon firing each of the samples.

The obtained sintered body is applied with a re-oxidation processing in an $N_2$ atmosphere at 600 to 800° C. to obtain a sample of a multi-layer ceramic capacitor 10.

For the sample of the obtained multi-layer ceramic capacitor 10, electrostatic capacity is measured by using an LCR meter manufactured by Agilent Technologies Inc. under the alternating voltage impression condition at 0.5 V, 1 kHz, and the permittivity is calculated by measuring the intersection area of the internal electrode layers 13, 14, the number of ceramic dielectric layers 12A put between the internal electrode layers 13, 14 (number of accumulating) and the thickness for one layer of the ceramic dielectric layers 12a based on the cross section of the sample of the multi-layer ceramic capacitor 10.

Further, for the dielectric layer 12A of the sample of the obtained multi-layer ceramic capacitor 10, the composition is analyzed by using ICP (emission spectral analysis) to determine the amount (mol) A of the Si oxide being converted as $SiO_2$ based on 100 mol of barium titanate and as a result of analysis on the composition for the crystal grain boundaries 17, 17 each between the ceramic crystal grains 16, 16 and the grain boundary triple point 18 on the cross section of the dielectric layer 12A by XRF (X-ray fluorescence analysis), it is found that the crystal grain boundaries 17, 17 and the grain boundary triple point 18 comprise an Si oxide.

Further, based on the thickness of the crystal grain boundary 17 between the ceramic crystal grains 16 and 16 and the area ratio of the Si oxide at the grain boundary triple point 18 based on the TEM photography for the cross section, the volumic ratio B for the crystal grain boundary 17 and the grain boundary triple point 18 is calculated. This calculation may be performed by measuring the average crystal grain radius ($R_{ave}$), the average thickness of the crystal grain boundaries ($D_{ave}$), and the areas of the grain boundary triple points that appear in the TEM image, and converting to a volume %. One suitable method for computing this can be expressed as follows:

$B(\text{vol \%}) = (b1+b2)^{3/2} * 100$, where $b1$ = area ratio of boundaries = $\pi((R_{ave}+D_{ave})^2 - R_{ave}^2)/\pi(R_{ave}+D_{ave})^2$
$b2$ = area ratio of boundary triple points The obtained result is shown in Table 1. "*" shows comparative examples relative to the invention.

Table 1 describes the sample No. the amount (mol) A of the Si oxide being converted as $SiO_2$ contained based on 100 mol of barium titanate, the rate of temperature reduction (° C./hr), the volumic ratio (vol %) B of the Si oxide present at the crystal grain boundary 17 and the grain boundary triple point 18 of ceramic dielectric layer 12a, B/A, and the permittivity $\in$ at a room temperature of 25° C., respectively.

TABLE 1

| Sample No. | A (mol) | Temperature falling speed (° C./h) | B (vol %) | B/A | Permittivity at 25° C. |
|---|---|---|---|---|---|
| * 1 | 0.5 | 500 | 0.43 | 0.860 | 2839 |
| * 2 | 0.5 | 200 | 0.32 | 0.640 | 2939 |
| * 3 | 0.5 | 150 | 0.249 | 0.498 | 3119 |
| 4 | 0.5 | 100 | 0.20 | 0.400 | 3187 |
| 5 | 0.5 | 10 | 0.15 | 0.300 | 3210 |
| * 6 | 1 | 500 | 0.90 | 0.900 | 2738 |
| * 7 | 1 | 200 | 0.64 | 0.640 | 2838 |
| * 8 | 1 | 150 | 0.524 | 0.524 | 2995 |
| 9 | 1 | 100 | 0.42 | 0.420 | 3076 |
| 10 | 1 | 10 | 0.31 | 0.310 | 3105 |
| * 11 | 2.5 | 500 | 2.40 | 0.960 | 2637 |
| * 12 | 2.5 | 200 | 1.62 | 0.648 | 2738 |
| * 13 | 2.5 | 150 | 1.38 | 0.552 | 2866 |
| 14 | 2.5 | 100 | 1.09 | 0.436 | 2972 |
| 15 | 2.5 | 10 | 0.77 | 0.308 | 3019 |
| * 16 | 5 | 500 | 5.10 | 1.020 | 2390 |
| * 17 | 5 | 200 | 3.88 | 0.776 | 2519 |
| * 18 | 5 | 150 | 2.81 | 0.562 | 2629 |
| 19 | 5 | 100 | 2.42 | 0.484 | 2874 |
| 20 | 5 | 10 | 1.66 | 0.332 | 2988 |
| * 21 | 7.5 | 500 | 7.70 | 1.027 | 2210 |
| * 22 | 7.5 | 200 | 6.13 | 0.817 | 2306 |
| * 23 | 7.5 | 150 | 4.22 | 0.563 | 2432 |
| 24 | 7.5 | 100 | 3.67 | 0.489 | 2789 |
| 25 | 7.5 | 10 | 2.70 | 0.360 | 2914 |
| * 26 | 10 | 500 | 11.40 | 1.140 | 1928 |
| * 27 | 10 | 200 | 7.82 | 0.782 | 2029 |
| * 28 | 10 | 150 | 5.88 | 0.588 | 2134 |
| 29 | 10 | 100 | 5.00 | 0.500 | 2650 |
| 30 | 10 | 10 | 3.50 | 0.350 | 2780 |

FIG. 3 is a graph showing the change of permittivity to B/A in the result described above.

As shown in FIG. 3, the points plotting the values of the permittivity relative to B/A are connected by a curve on each amount A of the Si oxide being converted as $SiO_2$ contained based on 100 mol of barium titanate. Each of the curves for the content of the Si oxide of 0.5 mol, 1.0 mol, 2.5 mol, 5.0 mol, 7.5 mol, and 10 mol is upward convex in a region where B/A is 0.5 or less and downward convex in a region where B/A is larger than 0.5 and has a point of inflexion in the vicinity of B/A=0.5. It can be seen that the degree of lowering the permittivity is extended when B/A exceeds the 0.5 as the point of inflexion.

From the result, it can be seen that a remarkable lowering of the permittivity $\epsilon$ can be suppressed by restricting B/A to 0.5 or less.

Further, FIG. 4 shows the change of permittivity $\epsilon$ to the rate of temperature reduction (° C./hr) in the step of firing the laminate chip in the results described above.

As shown in FIG. 4, points plotting the values of the permittivity $\epsilon$ to the rate of temperature reduction are connected by a curve on each amount of the Si oxide being converted as $SiO_2$ contained based on 100 mol of barium titanate. In each of the curves for the content of the Si oxide of 0.5 mol, 1.0 mol, 2.5 mol, 5.0 mol, 7.5 mol, and 10 mol, the change of permittivity $\epsilon$ is relatively moderate in a region where the rate of temperature reduction is 100° C./hr or lower, whereas the curve is convex downward in a region where the rate of temperature reduction exceeds 100° C./hr and has a point of inflexion near the rate of temperature reduction of 100° C./hr. Then it can be seen that the degree of lowering the permittivity $\epsilon$ is abruptly increased when the rate of temperature reduction exceeds 100° C./hr at the point of inflexion. From the result, it can be seen that remarkable lowering of the permittivity $\epsilon$ can be suppressed by restricting the rate of temperature reduction to 100° C./hr or less. The invention is suitable to a small large capacitance multi-layer ceramic capacitor to be mounted on electronic equipments of reduced thickness or portable type electronic equipments.

What is claimed is:

1. A multi-layer ceramic capacitor having a substantially hexahedral capacitor main body wherein:
    the ceramic dielectric layers comprise barium titanate;
    the internal electrode layers are laminated alternately; and
    the internal electrode layers are formed such that they are exposed at the ends thereof alternately to end faces opposed to each other, and a pair of external electrodes formed at the end faces where the ends of the internal electrode layers of the capacitor main body are exposed and connected electrically with the internal electrode layers;
    wherein the ceramic dielectric layer contains an Si oxide being converted as $SiO_2$ at a ratio of from 0.5 to 10 mol based on 100 mol of barium titanate, wherein;
    the ceramic dielectric layer has crystal grains, crystal grain boundaries present between the crystal grains and grain boundary triple points; and
    B/A is 0.5 or less, wherein the amount (mol) of an Si oxide being converted as $SiO_2$ contained based on 100 mol of barium titanate is A and wherein the volumic ratio (vol%) of the Si oxide present at the crystal grain boundary and the grain boundary triple point of the ceramic dielectric layer is B.

2. The multi-layer ceramic capacitor of claim 1, wherein said ceramic capacitor has one or more additional components selected from the group consisting of Mg oxide, Mn oxide and R oxide wherein R is at least one compound selected from the group consisting of Sc, Er, Tm, Yb, Lu, Y, Dy, Ho, Tb, Gd, and Eu.

3. The multi-layer ceramic capacitor of claim 2, wherein the Mg oxide is being converted as MgO at a ratio of from 0.1 to 2 mol based on 100 mol of barium titanate.

4. The multi-layer ceramic capacitor of claim 2, wherein the Mn oxide is being converted as $Mn_2O_3$ at a ratio of from 0.05 to 1 mol based on 100 mol of barium titanate.

5. The multi-layer ceramic capacitor of claim 2, wherein the R oxide is being converted as RO at a ratio of from 0.1 to 4 mol based on 100 mol of barium titanate.

6. The multi-layer ceramic capacitor of claim 1, wherein the internal electrode layers comprise a compound selected from the group consisting of Ni, Ni alloy, Cu, and Cu alloy.

7. The multi-layer ceramic capacitor of claim 1, wherein the crystal grain has an average size of 0.3 μm or less.

8. A capacitor made by the method of:
forming ceramic sheets comprising metal oxide and a silicon oxide sintering aid;
laminating the sheets with electrode material therebetween;
sintering the laminated sheets at an elevated temperature;
reducing the temperature from said elevated temperature at a selected rate such that the ratio B/A becomes less than or equal to 0.5, wherein A is the number of moles of silicon oxide being converted to silicon dioxide per 100 moles of barium titanate, and wherein B is the volumic ratio (vol %) of the Si oxide present at the crystal grain boundary and the grain boundary triple point of the ceramic sheet.

9. The method of claim 8, wherein the metal oxide comprises barium titanate.

10. The method of claim 9, wherein the silicon oxide is present in an amount of 0.5 to 10 mol being converted as $SiO_2$ based on 100 mol of barium titanate.

* * * * *